(12) United States Patent
Herlein et al.

(10) Patent No.: US 8,572,643 B2
(45) Date of Patent: Oct. 29, 2013

(54) METHOD, APPARATUS AND SYSTEM FOR DYNAMIC GROUPING AND CONTENT DISTRIBUTION

(75) Inventors: Gregory Charles Herlein, San Francisco, CA (US); David Chi-Wei Wang, San Francisco, CA (US)

(73) Assignee: Thomson Licensing, Boulogne-Billancourt (FR)

( * ) Notice: Subject to any disclaimer, the term of this patent is extended or adjusted under 35 U.S.C. 154(b) by 244 days.

(21) Appl. No.: 12/448,669

(22) PCT Filed: Jan. 31, 2007

(86) PCT No.: PCT/US2007/002562
§ 371 (c)(1),
(2), (4) Date: Jun. 29, 2009

(87) PCT Pub. No.: WO2008/094145
PCT Pub. Date: Aug. 7, 2008

(65) Prior Publication Data
US 2009/0300693 A1   Dec. 3, 2009

(51) Int. Cl.
*H04N 7/10* (2006.01)
*H04N 7/025* (2006.01)
*G06Q 30/00* (2012.01)

(52) U.S. Cl.
USPC ............ 725/32; 725/42; 705/14.5; 705/14.57

(58) Field of Classification Search
USPC .......................................................... 725/32
See application file for complete search history.

(56) References Cited

U.S. PATENT DOCUMENTS 5,389,963 A * 2/1995 Lepley et al. ................. 725/144

| 5,761,601 | A | 6/1998 | Nemirofsky et al. |
| 5,983,069 | A | 11/1999 | Cho et al. |
| 6,085,253 | A | 7/2000 | Blackwell et al. |
| 6,449,654 | B1 | 9/2002 | Blackwell et al. |

(Continued)

FOREIGN PATENT DOCUMENTS

| CN | 1303569 | 7/2011 |
| DE | 10357133 | 6/2005 |

(Continued)

OTHER PUBLICATIONS

Commerce Magazine: "Miser sur les sens pour motive l'achat," FR, No. 9, Sep. 2004, pp. 1-3, XP007901190.

(Continued)

*Primary Examiner* — Robert Hance
(74) *Attorney, Agent, or Firm* — Robert D. Shedd; Jorge Tony Villabon

(57) ABSTRACT

In one embodiment of the present invention, a system for dynamic content distribution and grouping includes a server for providing a plurality of content channels, at least one tuning/decoding means for receiving/decoding at least one of the plurality of content channels, and at least one respective display means for displaying the at least one received/decoded content channel. In such embodiments of the present invention, the server is configured to dynamically configure the at least one tuning/decoding means to receive/decode at least one of the plurality of content channels. More specifically, in embodiments of the present invention, the server dynamically configures the at least one tuning/decoding means by communicating a channel change command to the at least one tuning/decoding means over a dedicated radio-frequency channel or, in an alternate embodiment, using an internet protocol.

24 Claims, 5 Drawing Sheets

(56) References Cited

U.S. PATENT DOCUMENTS

| | | |
|---|---|---|
| 2002/0066106 A1* | 5/2002 | Kanojia et al. ............... 725/87 |
| 2003/0154130 A1 | 8/2003 | Woolley et al. |
| 2004/0103028 A1* | 5/2004 | Littman et al. ............... 705/14 |
| 2004/0165015 A1* | 8/2004 | Blum et al. ............... 345/962 |
| 2004/0181811 A1* | 9/2004 | Rakib ............... 725/122 |
| 2005/0004836 A1 | 1/2005 | Ruttenberg |
| 2005/0076373 A1 | 4/2005 | Jung |
| 2005/0193209 A1 | 9/2005 | Saunders et al. |
| 2007/0266153 A1* | 11/2007 | Barrett et al. ............... 709/225 |
| 2007/0278299 A1* | 12/2007 | Overhultz et al. ............ 235/383 |

FOREIGN PATENT DOCUMENTS

| | | |
|---|---|---|
| JP | 2002-044619 A2 | 2/2002 |
| JP | 2003-069983 A2 | 3/2003 |
| JP | 2006-080783 A2 | 3/2006 |
| WO | WO9841936 | 9/1998 |
| WO | WO9952285 | 10/1999 |
| WO | WO2007006746 | 1/2007 |

OTHER PUBLICATIONS

International Search Report, dated Oct. 24, 2007.

* cited by examiner

METHOD, APPARATUS AND SYSTEM FOR DYNAMIC GROUPING AND CONTENT DISTRIBUTION

This application claims the benefit, under 35 U.S.C. §365 of International Application PCT/US2007/002562, filed Jan. 31, 2007 which was published in accordance with PCT Article 21(2) on Aug. 7, 2008 in English.

TECHNICAL FIELD

The present invention generally relates to the distribution, display and control of content, and more particularly, to a method, apparatus and system for providing dynamic grouping and distribution of content.

BACKGROUND OF THE INVENTION

Content distribution systems are used to provide content to a plurality of end systems. For example, in video-on-demand applications media content has been made available to and utilized by satellite/cable television subscribers. Typically, subscribers can view at their television the video programs available for selection (sometimes for an additional fee) and upon selection made at the subscriber's set-top-box (STB), the program is sent from the program center to the set-top-box via the cable or satellite network. That is, in such media distribution systems, a selection has to be made at the point of display for determining media content to be viewed.

Similarly, in the advertising realm, providing in-store retail media content is becoming the most popular advertising medium in use today, with broadcast distribution being its primary means of content presentation. That is, in recent years retailers and the managers of public spaces have brought in video display systems for advertising use. In such systems, content is distributed by a server and received at a respective set-top-box for each display or group of displays. Retailers use the displays to present their current offerings or sale information, while the public spaces sell time on the video displays to advertisers either national or local, knowing that large numbers of consumers will see the presentation.

However, there are drawbacks to the currently available media distribution models, such as those described above. More specifically, in such applications, when broadcast means are established, the broadcasts means restricts all displays receiving the broadcast media content to presenting the same material simultaneously. That is, in currently available broadcast applications, media content is broadcast to a plurality of set-top boxes configured to receive the broadcast media content. The set-top boxes then communicate the media content to respective displays. As such, the displays associated with the set-top boxes that received the media content form a group of displays that present the same material simultaneously. The group of displays, however, is not dynamic and continue to present the same media content received by the respective set-top boxes configured to receive the broadcast media content. Such a limitation makes it impossible to change display groupings which can be advantageous in not only the video-on-demand and in-store advertising applications, but also in other current and future media content distribution applications.

Other drawbacks exist in other media content distribution applications as well. For example, in a non-broadcast scenario, the addition of a single piece of new content to a presentation loop would require the reediting of the display master media. In addition, in such media content distribution applications, it is not possible to vary the content or even the sequencing of the media content once it is deployed.

As such, there is thus a need for a new type of content distribution and grouping means which overcomes the above described deficiencies in the state of the art as well as other related deficiencies and which provides for content distribution including dynamic grouping without the need for manual intervention at the point of display.

SUMMARY OF THE INVENTION

The various embodiments of the present invention address these and other deficiencies of the prior art by providing a method, apparatus and system for providing dynamic grouping and distribution of content.

In one embodiment of the present invention, a method for dynamic grouping and content distribution includes providing a plurality of content channels and dynamically configuring at least one tuning/decoding means to receive/decode at least one of the plurality of content channels. In such an embodiment of the invention, the at least one tuning/decoding means can be at least one set-top box and the plurality of content channels can include advertising information.

In an alternate embodiment of the present invention, an apparatus for dynamic grouping and content distribution includes a memory for storing control programs and instructions and media content, and a processor for executing the control programs and instructions. In such an embodiment the apparatus is configured to provide a plurality of content channels, and to dynamically configure at least one tuning/decoding means to receive/decode at least one of the plurality of content channels. Again, in such an embodiment of the invention, the at least one tuning/decoding means can be at least one set-top box or, alternatively, can be a tuning/decoding means integrated into a respective display.

In an alternate embodiment of the present invention, a system for dynamic grouping and content distribution includes a server for providing a plurality of content channels, at least one tuning/decoding means for receiving/decoding at least one of the plurality of content channels, and at least one respective display means for displaying the at least one received content channel. In such an embodiment, the server is configured to dynamically configure the at least one tuning/decoding means to receive at least one of the plurality of content channels. In one embodiment of the present invention, the system comprises an in-store advertising environment. In addition, in various embodiments of the present invention, the server of the system dynamically groups the tuning/decoding means by configuring the tuning/decoding means to receive/decode a same content channel. In one embodiment of the present invention, the server dynamically configures the at least one tuning/decoding means by communicating a channel change command to the at least one tuning/decoding means, in one embodiment, over a dedicated radio-frequency channel or, in an alternate embodiment, using an internet protocol.

BRIEF DESCRIPTION OF THE DRAWINGS

The teachings of the present invention can be readily understood by considering the following detailed description in conjunction with the accompanying drawings, in which.

Figure 1:
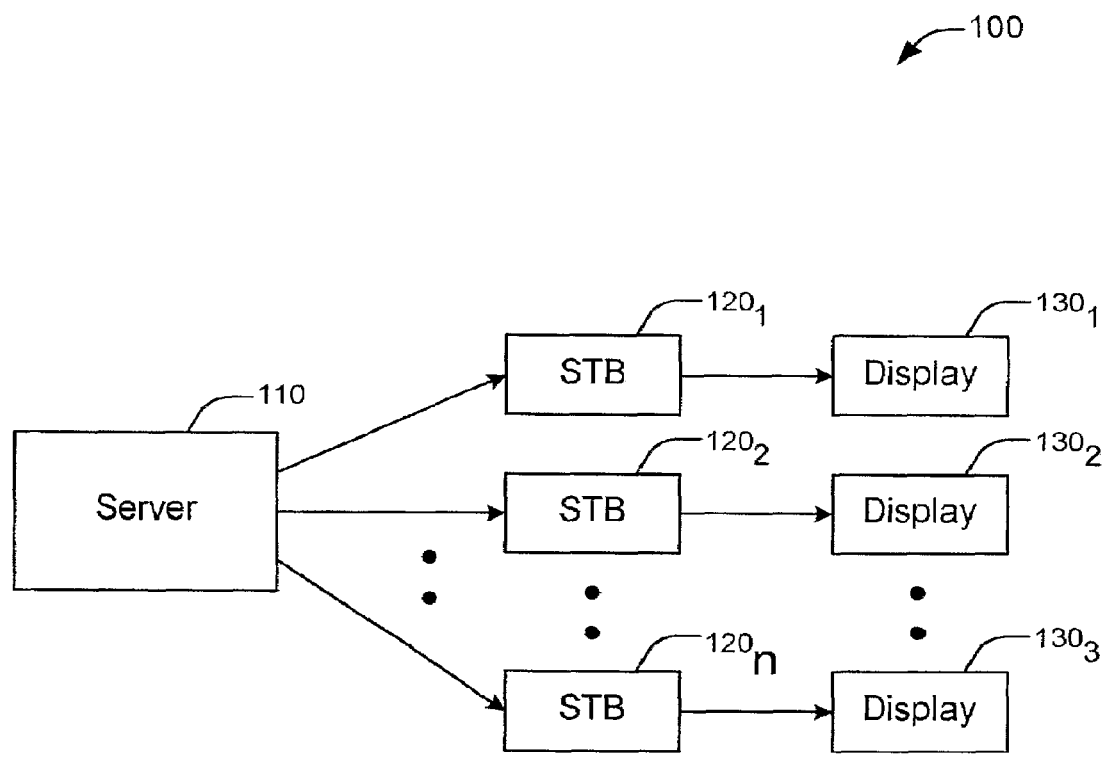
FIG. 1 depicts a high level block diagram of a content distribution system in accordance with an embodiment of the present invention.

It should be understood that the drawings are for purposes of illustrating the concepts of the invention and are not necessarily the only possible configuration for illustrating the invention. To facilitate understanding, identical reference numerals have been used, where possible, to designate identical elements that are common to the figures.

DETAILED DESCRIPTION OF THE INVENTION

The present invention advantageously provides a method, apparatus and system for dynamic grouping and distribution of content. Although the present invention will be described primarily within the context of an in-store advertising network, the specific embodiments of the present invention should not be treated as limiting the scope of the invention. It will be appreciated by those skilled in the art and informed by the teachings of the present invention that the concepts of the present invention can be advantageously applied in substantially any content distribution system. For example, the concepts of the present invention can be implemented in video-on-demand systems and the like.

The functions of the various elements shown in the figures can be provided through the use of dedicated hardware as well as hardware capable of executing software in association with appropriate software. When provided by a processor, the functions can be provided by a single dedicated processor, by a single shared processor, or by a plurality of individual processors, some of which can be shared. Moreover, explicit use of the term "processor" or "controller" should not be construed to refer exclusively to hardware capable of executing software, and can implicitly include, without limitation, digital signal processor ("DSP") hardware, read-only memory ("ROM") for storing software, random access memory ("RAM"), and non-volatile storage. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

In accordance with various embodiments of the present invention, promotional content and informational content from an advertiser, recording company, movie studio, and/or other content providers is collected and compiled by network management center and converted into digital data files. Assuming that digitization is the preferable means of distributing this information, digital data files are provided to a network operations center for distribution via, for example, satellite to one or more commercial sales outlets. Again, assuming a satellite multicast system is used, a receiver/decoder receives and decodes the digital information representing digital data files at a commercial sales outlet. The digital data files are then forwarded to a local server for local distribution. The server distributes the promotional information in, for example, digital data files to various points in the commercial sales outlet (e.g., wall-of-eyes, in-store radio system, displays, audio/video endcaps in various departments, listening posts, and other destinations). The displays display, for example, content stored either on storage systems or on the server.

In one embodiment of the present invention, the server can send a control signal to a set-top box to re-address/reconfigure the set-top box to receive a different content stream transmitted by the server. In response, the associated display(s) will display content respective to the newly received content stream. As such, set-top boxes and associated display(s) can by dynamically grouped and content is dynamically distributed. This is in stark contrast to either traditional "broadcast-to-all" models or "user content selection" models.

FIG. 1 depicts a high level block diagram of a content distribution system in accordance with an embodiment of the present invention. The content distribution system 100 of FIG. 1 illustratively comprises at least one server 110, a plurality of tuning/decoding means (illustratively set-top boxes (STBs)) $120_1$-$120_n$, and a respective display $130_1$-$130_n$ for each of the set-top boxes $120_1$-$120_n$. Although in the system 100 of FIG. 1, each of the plurality of set-top boxes $120_1$-$120_n$, is illustratively connected to a single, respective display, in alternate embodiments of the present invention, each of the plurality of set-top boxes $120_1$-$120_n$, can be connected to more than a single display. In addition, although in the content distribution system 100 of FIG. 1 the tuning/decoding means are illustratively depicted as set-top boxes 120, in alternate embodiments of the present invention, the tuning/decoding means of the present invention can comprise alternate tuning/decoding means such as a tuning/decoding circuit integrated into the displays 130 or other stand alone tuning/decoding devices and the like.

Figure 2:
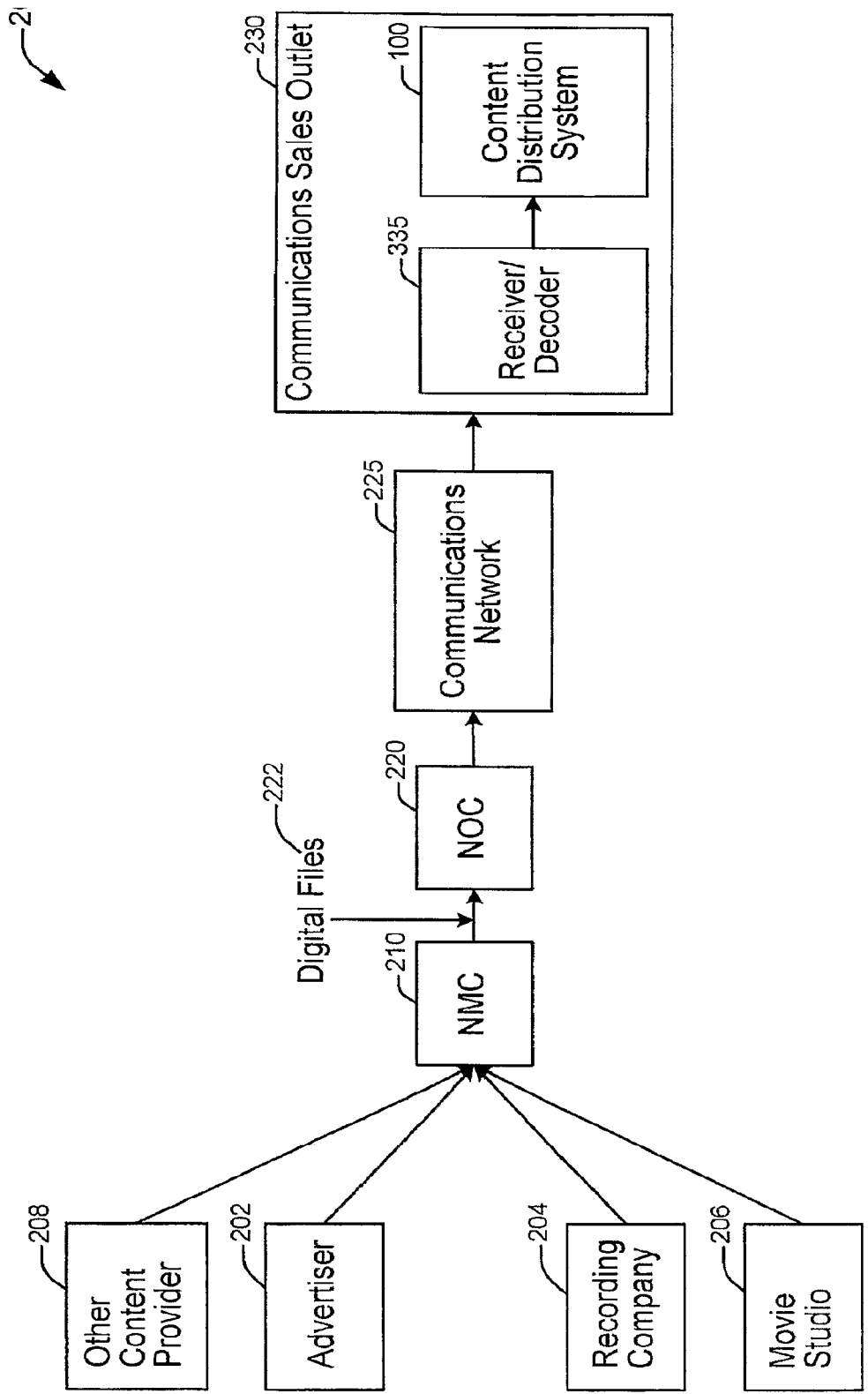
FIG. 2 depicts a high level block diagram of an in-store advertising network in which an embodiment of the content distribution system of FIG. 1 can be applied in accordance with an embodiment of the present invention.

In one embodiment of the present invention, the content distribution system 100 of FIG. 1 can be a part of an in-store advertising network. For example, FIG. 2 depicts a high level block diagram of an in-store advertising network 200 for providing in-store advertising. In the advertising network 200 of FIG. 2, the advertising network 200 and distribution system 100 employ a combination of software and hardware that provides cataloging, distribution, presentation, and usage tracking of music recordings, home video, product demonstrations, advertising content, and other such content, along with entertainment content, news, and similar consumer informational content in an in-store setting. The content can include content presented in compressed or uncompressed video and audio stream format (e.g., MPEG4/MPEG4 Part 10/AVC-H.264, VC-1, Windows Media, etc.), although the present system should not be limited to using only those formats.

In one embodiment of the present invention, software for controlling the various elements of the in-store advertising network 200 and the content distribution system 100 can include a 32-bit operating system using a windowing environment (e.g., MS-Windows™ or X-Windows operating system) and high-performance computing hardware. The advertising network 200 can utilize a distributed architecture and provides centralized content management and distribution control via, in one embodiment, satellite (or other method, e.g., a wide-area network (WAN), the Internet, a series of microwave links, or a similar mechanism) and in-store modules.

As depicted in FIG. 2, the content for the in-store advertising network 200 and the content distribution system 100 can be provided from an advertiser 202, a recording company 204, a movie studio 206 or other content providers 208. An advertiser 202 can be a product manufacturer, a service provider, an advertising company representing a manufacturer or service provider, or other entity. Advertising content from the advertiser 202 can consist of audiovisual content including commercials, "info-mercials", product information and product demonstrations, and the like.

A recording company 204 can be a record label, music publisher, licensing/publishing entity (e.g., BMI or ASCAP), individual artist, or other such source of music-related content. The recording company 204 provides audiovisual content such as music clips (short segments of recorded music), music video clips, and the like. The movie studio 206 can be a movie studio, a film production company, a publicist, or other source related to the film industry. The movie studio 106 can provide movie clips, pre-recorded interviews with actors and actresses, movie reviews, "behind-the-scenes" presentations, and similar content.

The other content provider 208 can be any other provider of video, audio or audiovisual content that can be distributed and displayed via, for example, the content distribution system 100 of FIG. 1.

In one embodiment of the present invention, content is procured via the network management center 210 (NMC) using, for example, traditional recorded media (tapes, CD's, videos, and the like). Content provided to the NMC 210 is compiled into a form suitable for distribution to, for example, the local distribution system 100, which distributes and displays the content at a local site.

The NMC 210 can digitize the received content and provide it to a Network Operations Center (NOC) 220 in the form of digitized data files 222. It will be noted that data files 222, although referred to in terms of digitized content, can also be streaming audio, streaming video, or other such information. The content compiled and received by the NMC 210 can include commercials, bumpers, graphics, audio and the like. All files are preferably named so that they are uniquely identifiable. More specifically, the NMC 210 creates distribution packs that are targeted to specific sites, such as store locations, and delivered to one or more stores on a scheduled or on-demand basis. The distribution packs, if used, contain content that is intended to either replace or enhance existing content already present on-site (unless the site's system is being initialized for the first time, in which case the packages delivered will form the basis of the site's initial content). Alternatively, the files may be compressed and transferred separately, or a streaming compression program of some type employed.

The NOC 220 communicates digitized data files 222 to, in this example, the content distribution system 100 at a commercial sales outlet 230 via a communications network 225. The communications network 225 can be implemented in any one of several technologies. For example, in one embodiment of the present invention, a satellite link can be used to distribute digitized data files 222 to the content distribution system 100 of the commercial sales outlet 230. This enables content to easily be distributed by broadcasting (or multicasting) the content to various locations. Alternatively, the Internet can be used to both distribute audiovisual content to and allow feedback from commercial sales outlet 230. Other ways of implementing communications network 225, such as using leased lines, a microwave network, or other such mechanisms can also be used in accordance with alternate embodiments of the present invention.

Figure 3:
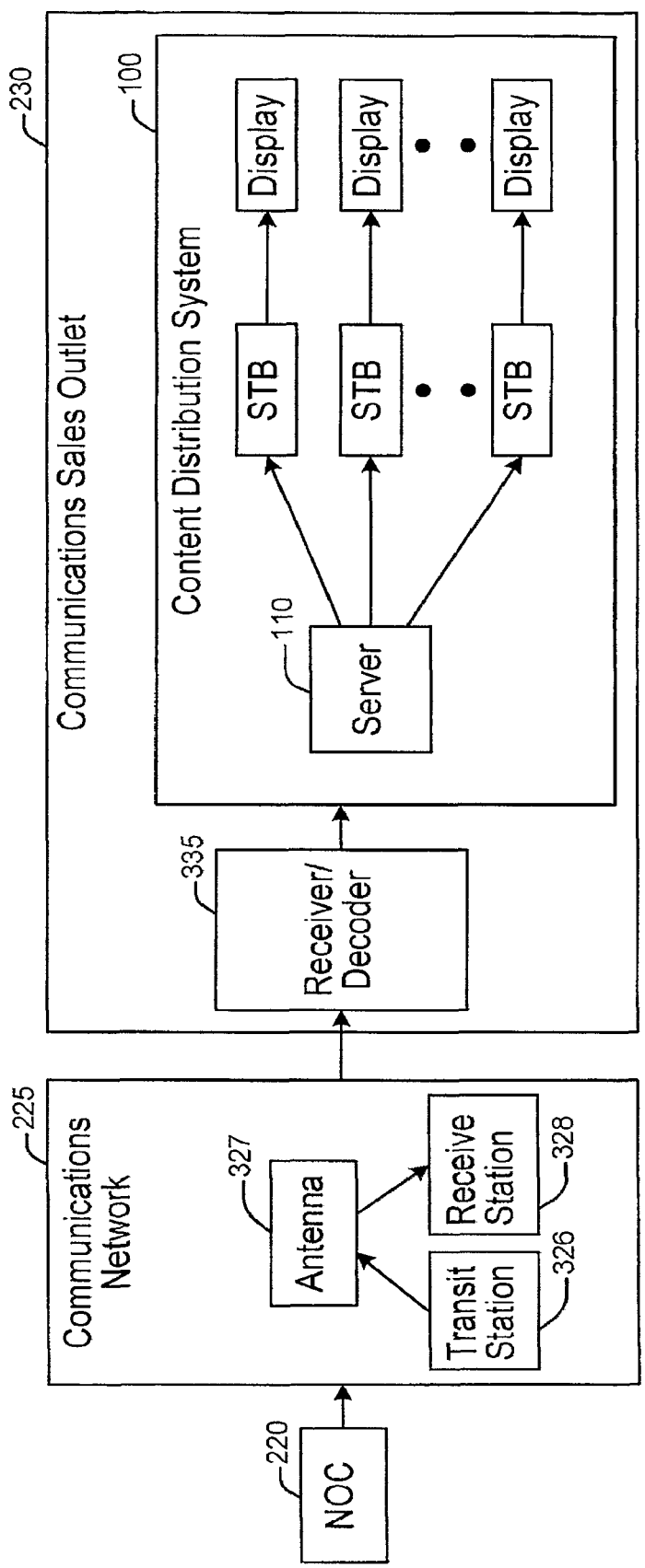
FIG. 3 depicts a high level block diagram of a communications network suitable for use in the in-store advertising network of FIG. 2 in accordance with an embodiment of the present invention.

For example, FIG. 3 depicts a high level block diagram of a communications network 325 in accordance with an embodiment of the present invention. The communications network 325 of FIG. 3 illustratively comprises a satellite link that includes a transmitting station 326, a satellite/antenna 327, and a receiving station 328. Although the receiving station 328 is depicted in block 225 of FIG. 3 as comprising a part of the communications network for discussion purposes, it should be noted that the physical location of the receiving station 328 can be at the commercial sales outlet 230. In addition, at the commercial sales outlet 230 is a receiver/decoder 335. Digital data files 222 are sent by the NOC 220 via the transmitting station 326 to the satellite/antenna 327, which then broadcasts this information to various locations, such as the commercial sales outlets (exemplified by commercial sales outlet 230). The commercial sales outlets receive the transmitted files via, for example, satellite receiving systems, such as the receiving station 328. The digitized information is then provided to the receiver/decoder 335 which then distributes this information to various points in the commercial sales outlet 230, including the content distribution system 100.

More specifically, the receiver/decoder 335 is capable of receiving both digital and analog information. With regard to data reception and distribution, the receiver/decoder 335 is connected to various network nodes in the commercial sales outlet 230, including the content distribution system 100 and specifically the server 110 of the content distribution system 100, via a network system 350. The content distribution system 100 is connected via the network system 350 (e.g., an ether network using a TCP/IP protocol stack, and using FTP file transfers to distribute the promotional information) to various nodes in the commercial sales outlet 230.

The server 110 of the content distribution system 100 is capable of receiving content (e.g., distribution packs) and, accordingly, distribute them in-store to the various set-top boxes 120 and displays 130. That is in one embodiment of the present invention, at the content distribution system 100, content is received and configured for streaming. In various embodiments of the present invention, the streaming can be performed by one or more servers configured to act together or in concert. The streaming content can include content configured for various different locations or products throughout the sales outlet 230 (e.g., store). For example, respective set-top boxes 120 and displays 130 can be located at specific locations throughout the sales outlet 230 and respectively configured to display content pertaining to products located within a predetermined distance from the location of each respective set-top box and display. In one embodiment of the present invention, the server 110 of the content distribution system 100 receives content and creates various different streams (e.g., content channels) to be communicated to the various set-top boxes 120 to be displayed by the displays 130. The streams can be individual channels of modulated audio/video onto a radio frequency distribution or transmitted as data flows within a unicast or multicast internet protocol (IP) network. These streams can originate from one or more servers under the same logical set of control software.

Figure 4:
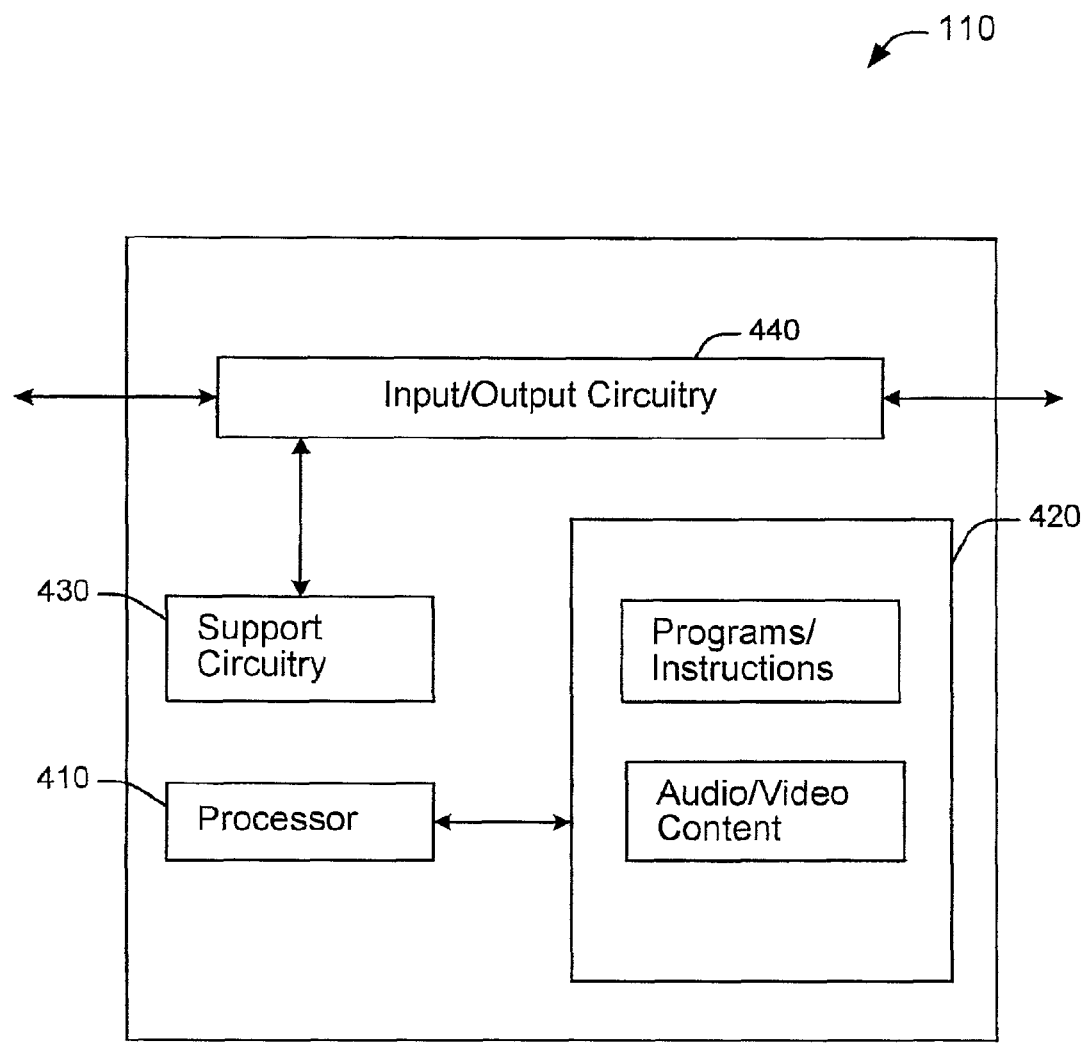
FIG. 4 depicts a high level block diagram of an embodiment of a server 110 suitable for use in the content distribution system 100 of FIG. 1 in accordance with the present invention.

FIG. 4 depicts a high level block diagram of an embodiment of a server 110 suitable for use in the content distribution system 100 of FIG. 1 in accordance with the present invention. The server 110 of FIG. 4 comprises a processor 410 as well as a memory 420 for storing control programs, instructions, software, advertising content and the like. The processor 410 cooperates with conventional support circuitry 430 such as power supplies, clock circuits, cache memory and the like as well as circuits that assist in executing the software routines stored in the memory 420. As such, it is contemplated that some of the process steps discussed herein as software processes may be implemented within hardware, for example, as circuitry that cooperates with the processor 410 to perform various steps. The server 110 also contains input-output circuitry 440 that forms an interface between the various respective functional elements communicating with the server 110.

Although the server 110 of FIG. 4 is depicted as a general purpose computer that is programmed to perform various control functions in accordance with the present invention, the invention can be implemented in hardware, for example, as an application specified integrated circuit (ASIC). As such, the process steps described herein are intended to be broadly interpreted as being equivalently performed by software, hardware, or a combination thereof.

In one embodiment of the present invention, one or more of the set-top boxes 120 are configured to receive a specific one of the created streams depending on the content of the created stream and the products located proximate to the display 130 on which a respective stream is to be displayed. As such, displays 130 that are intended to display the same stream from the server will be associated with set-top boxes 120 configured to receive that particular content stream. The displays 130 displaying the same stream can be considered a display group and the associated set-top boxes 120 receiving the same content stream can also be considered a group. For example, during a "headline" event, all of the set-top boxes 120 are configured by the server 110 to receive a content channel configured by the server 110 as a "headline" channel for simultaneous display by all of the displays 130. That is, during a "headline" event, the server 110 configures the set-top boxes 120 to receive a "headline" channel as opposed to having to communicate the "headline" channel to each and every set-to box 120, which can cause timing issues or as opposed to having to change a selection channel on each set-top box.

In accordance with the present invention, a set-top box group and associated display group can be dynamically reconfigured. More specifically, in one embodiment of the present invention, a set-top box 120 can be reconfigured to receive a different content stream from the server 110 and thus, the associated display(s) 130 will display the respective content. That is, in one embodiment of the present invention, the server 110 can send a control signal to a set-top box 120 to re-address the set-top box 120 to switch to receiving a different content stream transmitted by the server 110. In response, the associated display(s) 130 will display content respective to the newly received content stream. For example, in one embodiment of the present invention, a tuner of a respective set-top box is configured by the server 110 to receive a specific content channel. In an alternate embodiment of the present invention in which internet protocol is used, an internet protocol decoder (e.g., an internet protocol television (IPTV) decoder) of a respective set-top box is configured or re-configured by the server 110 to decode at least one content channel for dynamic content distribution and grouping in accordance with embodiments of the present invention.

As such, set-top boxes 120 and associated display(s) 130 can by dynamically grouped and content dynamically distributed to accommodate the needs of the sales outlet's 130 (e.g., retail store) advertising and audio/visual requirements. For example, if the configuration of the sales outlet 230 changes (i.e., products are moved or re-arranged), the respective set-top boxes 120 and displays 130 can be dynamically reconfigured and grouped in accordance with the present invention to select an alternate content stream to reflect, for example, different products now in proximate location of the set-top boxes 120 and respective displays 130 due to the reconfiguration of the sales outlet 230.

In various embodiments of the present invention, the logical grouping of channels is controlled by software operating on the server and commands are sent using appropriate protocols over appropriate communication paths to the set-top boxes. In one embodiment of the present invention, the server sends channel change commands over a dedicated radio-frequency channel. In an alternate embodiment, internet protocol (IP) networks are used to send commands to the set-top boxes using, for example, the Real-Time Streaming Protocol (RTSP), Simple Network Management Protocol (SNMP) or other appropriate control protocol, although the present system should not be limited to using only those formats for communicating a channel change command.

Figure 5:
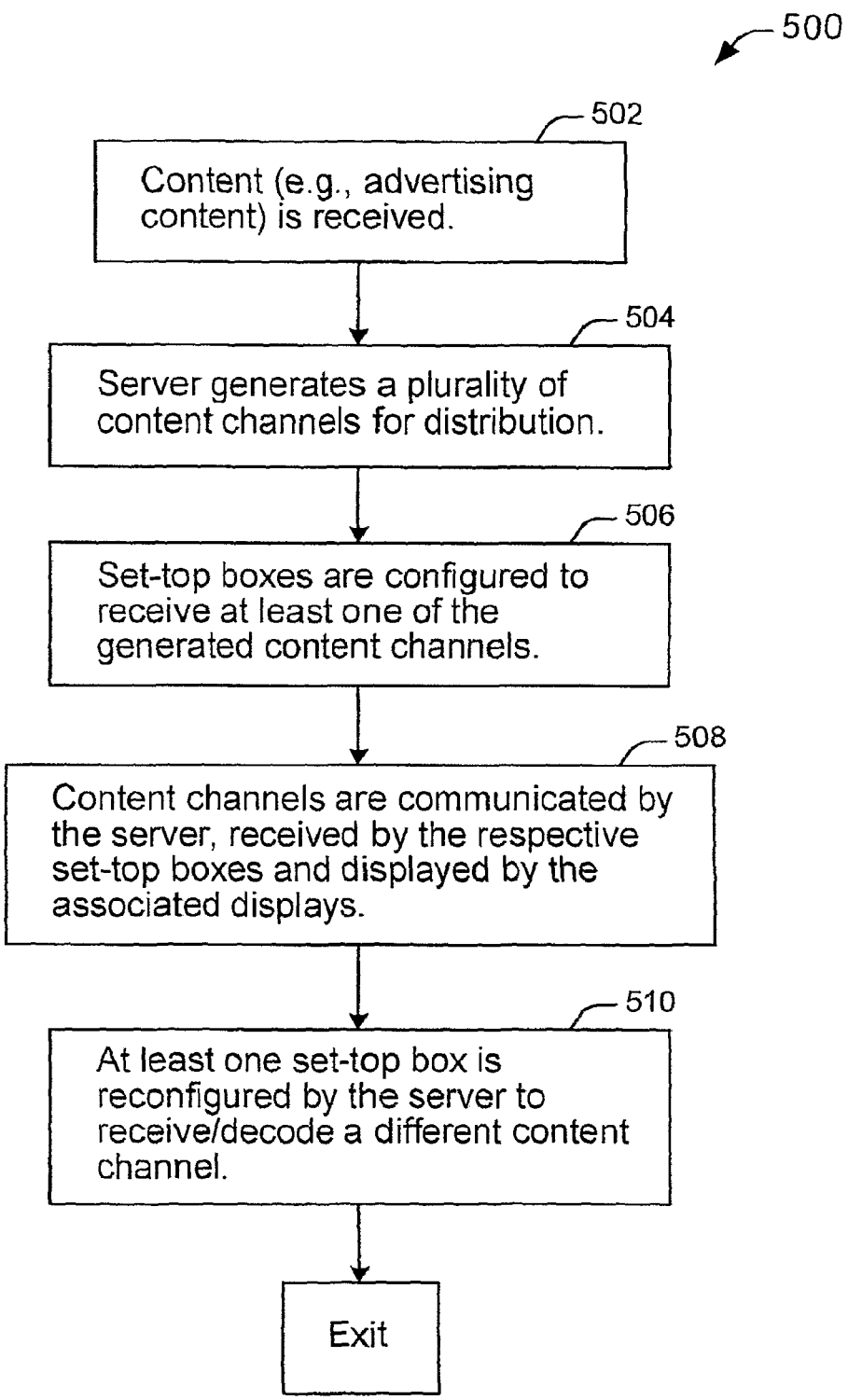
FIG. 5 depicts a flow diagram of a method for dynamic grouping and content distribution in accordance with an embodiment of the present invention.

FIG. 5 depicts a flow diagram of a method for dynamic grouping and content distribution in accordance with an embodiment of the present invention. The method of FIG. 5 begins in step 502, in which content is received by a server in a local content distribution system. The method then proceeds to step 504.

At step 504, the server generates a plurality of content streams (e.g., content channels) for distribution to various set-top boxes and respective displays. The method then proceeds to step 506.

At step 506, the set-top boxes are configured (e.g., addressed, tuned) to receive at least one of the generated content channels. The method then proceeds to step 508.

At step 508, content channels are communicated by the server, received by the respective set-top boxes 120 and displayed by the associated displays 130. The method then proceeds to step 510.

At step 510, at least one of the set-top boxes 120 is reconfigured (e.g., re-addressed) by, for example the server 110, to receive/decode a different content channel in response to, for example, a reconfiguration of a product display or placement. As such, the display(s) 130 associated with the reconfigured set-top box(s) 120 display the new content associated with the alternate content channel now received/decoded by the respective set-top box(s) 120. The reconfigured set-top box(s) 120 and respective display(s) 130 can now be considered part of a different group of set-top boxes 120 and displays 130 that all receive the same content channel. The method can then be exited.

In the manner described above, set-top box(s) 120 and respective displays 130 can be dynamically grouped and content can be dynamically distributed in accordance with embodiments of the present invention.

Having described preferred embodiments for a method, apparatus and system for providing dynamic grouping and distribution of content (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. While the forgoing is directed to various embodiments of the present invention, other and further embodiments of the invention may be devised without departing from the basic scope thereof.

The invention claimed is:

1. A method for dynamic content distribution, comprising:
providing a plurality of content channels; and
dynamically grouping receiving means, by an apparatus, by configuring at least two receiving means to receive a same content channel wherein the grouping of said receiving means depends on the content on the content channel and on products located proximate to said receiving means.

2. The method of claim 1, further comprising:
displaying a received content channel on at least one respective display.

3. The method of claim 1, wherein said content channels comprise advertising content consisting of audiovisual content including at least one of commercials, info-mercials, product information and product demonstrations.

4. The method of claim 1, wherein said dynamically configuring comprises communicating a channel change command to at least one receiving means over a dedicated radio-frequency channel.

5. The method of claim 1, wherein said dynamically configuring comprises communicating a channel change command to at least one receiving means using an internet protocol.

6. The method of claim 5, wherein said internet protocol comprises a real-time streaming protocol (RTSP), or a simple network management protocol (SNMP).

7. The method of claim 1, wherein at least one content channel comprises a headline channel and all of said receiving means are configured to receive said headline channel.

8. The method of claim 1, wherein said method is performed in an in-store advertising environment.

9. The method of claim 1, wherein at least one receiving means comprises at least one set-top box.

10. The method of claim 1, wherein at least one receiving means is integrated into at least one respective display means.

11. An apparatus for dynamic content distribution, comprising:
a memory for storing control programs and instructions and media content; and
a processor for executing the control programs and instructions, said apparatus configured to:
provide a plurality of content channels; and
dynamically group receiving means by configuring at least two of said receiving means to receive a same content channel wherein the grouping of said receiving means depends on the content on the content channel and on the products located proximate to said receiving means.

12. The apparatus of claim 11, wherein said apparatus configures said content channels to include advertising content consisting of at least one of commercials, info-mercials, product information and product demonstrations.

13. The apparatus of claim 11, wherein said apparatus dynamically configures at least one receiving means by communicating a channel change command to said at least one receiving means over a dedicated radio-frequency channel.

14. The apparatus of claim 11, wherein said apparatus dynamically configures at least one receiving means by communicating a channel change command to said at least one receiving means using an internet protocol.

15. The apparatus of claim 14, wherein said internet protocol comprises a real-time streaming protocol (RTSP), or a simple network management protocol (SNMP).

16. The apparatus of claim 11, wherein at least one content channel comprises a headline channel and all of said receiving means are configured to receive said headline channel.

17. The apparatus of claim 11, wherein at least one receiving means comprises at least one set-top box.

18. A system for dynamic content distribution, comprising:
a server for providing a plurality of content channels;
at least one receiving means for receiving at least one of said plurality of content channels; and
at least one respective display means for displaying said at least one received content channel;
wherein said server is configured to dynamically group receiving means by configuring at least two of said receiving means to receive a same content channel wherein the grouping of said receiving means depends on the content on the content channel and on the products located proximate to said receiving means.

19. The system of claim 18, wherein said server configures said content channels to include advertising content consisting of at least one of commercials, info-mercials, product information and product demonstrations.

20. The system of claim 18, wherein said server dynamically configures said at least one receiving means by communicating a channel change command to said at least one receiving means over a dedicated radio-frequency channel.

21. The system of claim 18, wherein said server dynamically configures said at least one receiving means by communicating a channel change command to said at least one receiving means using an internet protocol.

22. The system of claim 18, wherein said at least one receiving means comprises at least one set-top box.

23. The system of claim 18, wherein said at least one receiving means is integrated into said at least one respective display means.

24. The system of claim 18, wherein said system comprises an in-store advertising network.

* * * * *